United States Patent
Plummer (10) Patent No.: US 9,239,659 B2
(45) Date of Patent: Jan. 19, 2016

(54) CONTENT DISTRIBUTION SYSTEM AND METHOD

(71) Applicant: James Plummer, San Francisco, CA (US)

(72) Inventor: James Plummer, San Francisco, CA (US)

(73) Assignee: Google Inc., Mountain View, CA (US)

( * ) Notice: Subject to any disclaimer, the term of this patent is extended or adjusted under 35 U.S.C. 154(b) by 188 days.

(21) Appl. No.: 13/664,904

(22) Filed: Oct. 31, 2012

(65) Prior Publication Data

US 2014/0123029 A1    May 1, 2014

(51) Int. Cl.
G06F 3/00 (2006.01)
G06F 3/0481 (2013.01)
G06Q 50/00 (2012.01)
G06Q 10/10 (2012.01)

(52) U.S. Cl.
CPC ............ *G06F 3/0481* (2013.01); *G06Q 10/107* (2013.01); *G06Q 50/01* (2013.01)

(58) Field of Classification Search
CPC .... H04L 12/581; G06F 3/0481; G06Q 10/10; G06Q 50/01
USPC ........... 715/733, 753, 758, 744, 766; 709/204
See application file for complete search history.

(56) References Cited

U.S. PATENT DOCUMENTS

| | | |
|---|---|---|
| 2009/0112467 A1 | 4/2009 | Jiang et al. |
| 2010/0023871 A1* | 1/2010 | Bederson et al. ............ 715/745 |
| 2012/0084676 A1* | 4/2012 | de Paz ........................... 715/761 |
| 2012/0192087 A1 | 7/2012 | Lemmey |
| 2012/0206464 A1 | 8/2012 | Kim et al. |
| 2012/0268361 A1 | 10/2012 | Shotel et al. |
| 2014/0013248 A1* | 1/2014 | Verstraete ..................... 715/758 |

FOREIGN PATENT DOCUMENTS

KR    1020110123064    11/2011

OTHER PUBLICATIONS

International Search Report for PCT Application No. PCT/US2013/067554 dated Feb. 18, 2104, 11 pages.

* cited by examiner

*Primary Examiner* — Haoshian Shih
(74) *Attorney, Agent, or Firm* — Patent Law Works LLP (57) ABSTRACT

A method and computing system for associating a first portion of a display screen with a social network, wherein the display screen is included within a handheld device. Initial social network content is received from the social network, wherein the initial social network content is associated with an event occurring within the social network. The initial social network content is dynamically rendered within the first portion of the display screen. A user indication is received within the first portion of the display screen. In response to the user indication, enhanced social network content is rendered within a second portion of the display screen. The initial social network content is at least a portion of a media stream included within the social network. The enhanced social network content includes content associated with the event occurring within the social network.

23 Claims, 5 Drawing Sheets

CONTENT DISTRIBUTION SYSTEM AND METHOD

TECHNICAL FIELD

This disclosure relates to events within a social network and, more particularly, to the distribution of content concerning such events within a social network.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites and topical blogs.

As is known in the art, the phrase social network may be used to refer to a group of technologies (e.g. Web-based and mobile technologies) that allow for users to engage in a quasi-real-time, interactive dialogue. Social networking websites have allowed people to interact and socialize in ways that were unimaginable ten years ago. For example, the use of such social networking websites has allowed for long lost friends to be reunited, long-distance friendships to be easily maintained, and information to be broadcast to groups of people. Further and through the use of such social networks, friends may schedule various types of events, such as online video chats and in-person gatherings.

SUMMARY OF DISCLOSURE

In one implementation, a computer-implemented method includes associating a first portion of a display screen with a social network, wherein the display screen is included within a handheld device. Initial social network content is received from the social network, wherein the initial social network content is associated with an event occurring within the social network. The initial social network content is dynamically rendered within the first portion of the display screen. A user indication is received within the first portion of the display screen. In response to the user indication, enhanced social network content is rendered within a second portion of the display screen. The enhanced social network content includes content associated with an event occurring within the social network.

In another implementation, a computer-implemented method includes associating a first portion of a display screen with a social network. Initial social network content is received from the social network, wherein the initial social network content is associated with an event occurring within the social network. The initial social network content is dynamically rendered within the first portion of the display screen. The display screen may be included within a handheld device.

One or more of the following features may be included. Dynamically rendering the initial social network content within the first portion of the display screen may include scrolling the initial social network content within the first portion of the display screen. Dynamically rendering the initial social network content within the first portion of the display screen may include rendering the initial social network content in a non-static manner.

The initial social network content may include text-based initial social network content. The initial social network content may be at least a portion of a media stream included within the social network. A user indication may be received within the first portion of the display screen. In response to the user indication, enhanced social network content may be rendered within a second portion of the display screen. The enhanced social network content may include an image. The enhanced social network content may include content associated with an event occurring within the social network. The display screen may be a touch screen and the user indication may be received in response to a user of the handheld device touching the touch screen.

In another implementation, a computing system includes a processor and memory configured to perform operations including associating a first portion of a display screen with a social network. Initial social network content is received from the social network, wherein the initial social network content is associated with an event occurring within the social network. The initial social network content is dynamically rendered within the first portion of the display screen. The display screen may be included within a handheld device.

One or more of the following features may be included. Dynamically rendering the initial social network content within the first portion of the display screen may include scrolling the initial social network content within the first portion of the display screen. Dynamically rendering the initial social network content within the first portion of the display screen may include rendering the initial social network content in a non-static manner.

The initial social network content may include text-based initial social network content. The initial social network content may be at least a portion of a media stream included within the social network. A user indication may be received within the first portion of the display screen. In response to the user indication, enhanced social network content may be rendered within a second portion of the display screen. The enhanced social network content may include an image. The enhanced social network content may include content associated with an event occurring within the social network. The display screen may be a touch screen and the user indication may be received in response to a user of the handheld device touching the touch screen.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
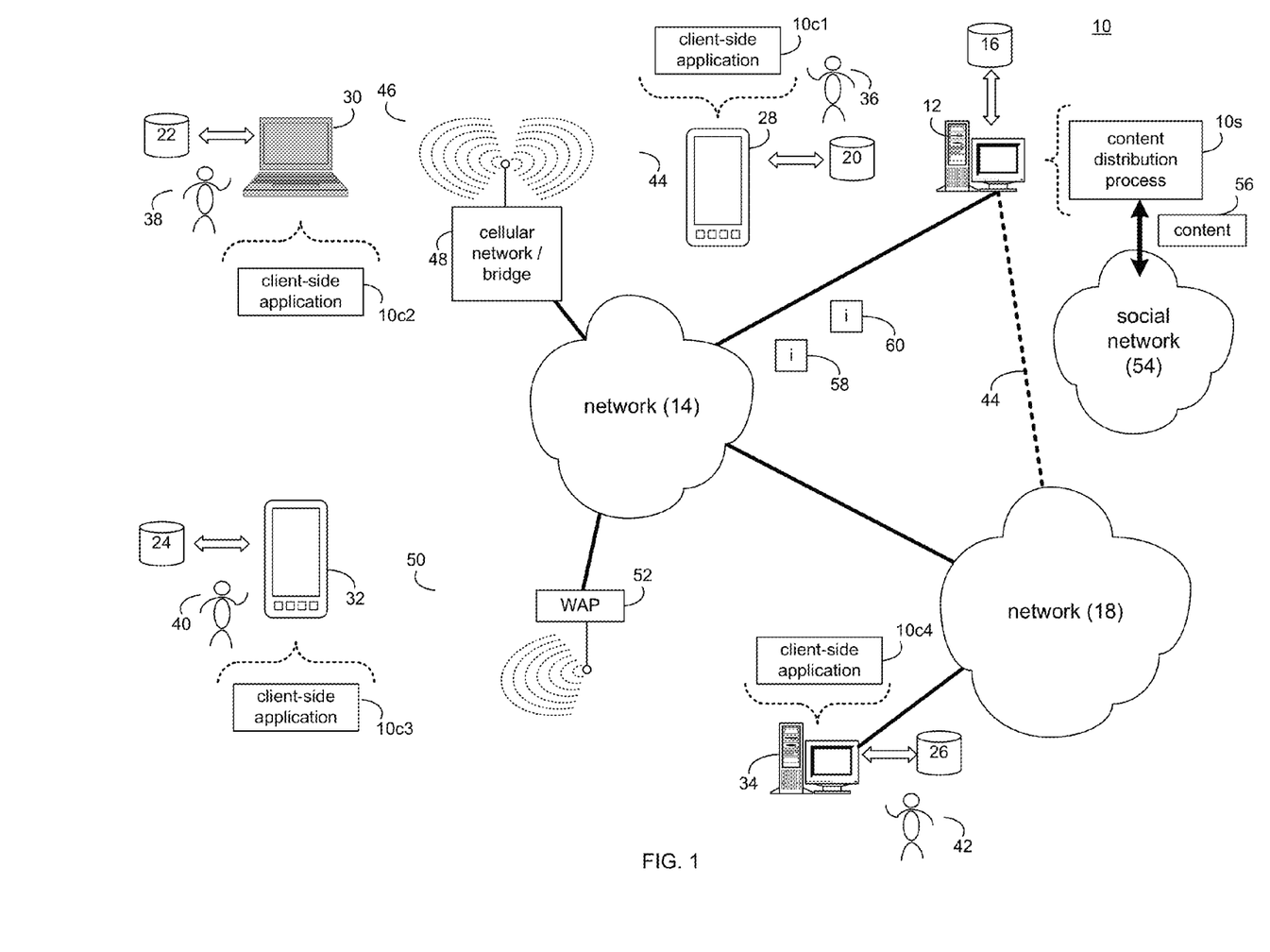
FIG. 1 is a diagrammatic view of a distributed computing network including a computing device that executes a content distribution process according to an embodiment of the present disclosure.
Figure 2:
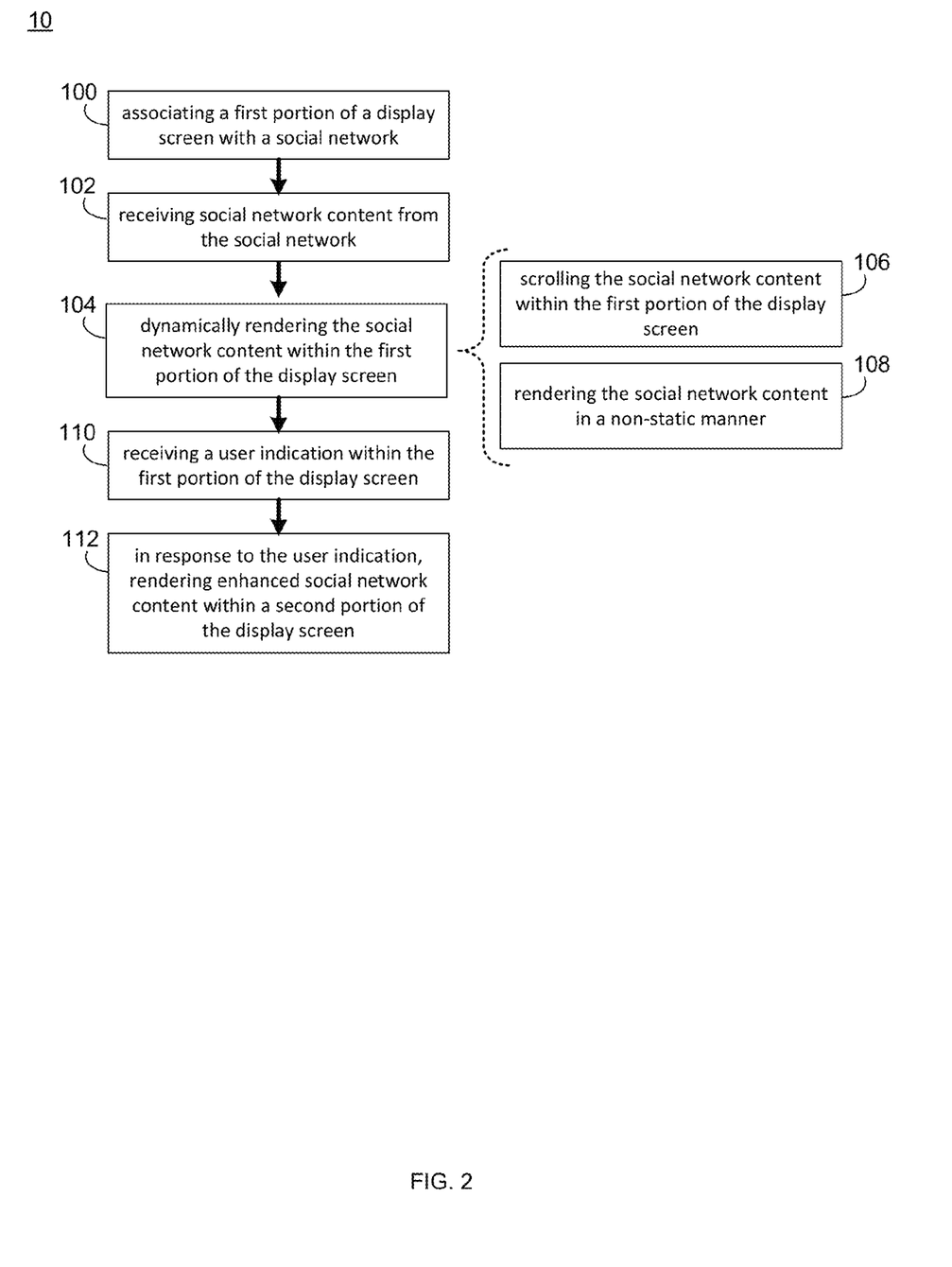
FIG. 2 is a flowchart of the content distribution process of FIG. 1 according to an embodiment of the present disclosure.

In FIGS. 1 & 2, there is shown content distribution process 10. Content distribution process 10 may be implemented as a server-side process, a client-side process, or a hybrid server-side/client-side process. For example, content distribution process 10 may be implemented as a purely server-side process via content distribution process 10s. Alternatively, content distribution process 10 may be implemented as a purely client-side process via one or more of client-side application 10c1, client-side application 10c2, client-side application 10c3, and client-side application 10c4. Alternatively still, content distribution process 10 may be implemented as a hybrid server-side/client-side process via content distribution process 10s in combination with one or more of client-side application 10c1, client-side application 10c2, client-side application 10c3, and client-side application 10c4. Accordingly, content distribution process 10 as used in this disclosure may include any combination of content distribution process 10s, client-side application 10c1, client-side application 10c2, client-side application 10c3, and client-side application 10c4.

As will be discussed below in greater detail, content distribution process 10 may associate 100 a first portion of a display screen with a social network. Initial social network content may be received 102 from the social network, wherein the initial social network content is associated with an event occurring within the social network. The initial social network content may be dynamically rendered 104 within the first portion of the display screen, which may be included within a handheld device.

Content distribution process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of content distribution process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, a game console user interface, or a specialized application (e.g., an application running on e.g., the Android™ platform or the iPhone™ platform). The instruction sets and subroutines of client-side applications 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access content distribution process 10 directly through network 14 or through secondary network 18. Further, content distribution process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

As is known in the art, users of a social network 54 (e.g., Google+™) may be able to schedule events, wherein an event is a group activity in which multiple users of social network 54 may get together for a specific purpose. Examples of such events may include but are not limited to: a group of friends getting together for drinks, several people going to a baseball game together, an end of summer party at a person's house, and a concert at a local arena. While the above discussion concerns Google+™, this is for illustrative purposes only and is not intended to be a limitation of this disclosure. For example, content distribution process 10 may be included within or utilized by any social networking website (e.g., Google+™, Facebook™, Twitter™).

Content distribution process 10 may be included within, executed within, or a portion of social network 54. As discussed above, the phrase social network may be used to refer to a group of technologies (e.g. web-based and mobile technologies) that allow for users to engage in a quasi-real-time, interactive dialogue.

As discussed above and as will be discussed below in greater detail, content distribution process 10 may associate 100 a first portion of a display screen of a handheld device (e.g., data-enabled, cellular telephone 28) with social network 54. Initial social network content 56 may be received 102 from social network 54, wherein the initial social network content is associated with an event occurring within the social network. Initial social network content 56 may be dynamically rendered 104 within the first portion of the display screen. Initial social network content 56 may be at least a portion of a media stream (not shown) included within social network 54.

For illustrative purposes, assume that a group of people that have not seen each other in a while would like to get together and have pizza some place in Mountain View, Calif. Social network 54 may be configured to allow a user (e.g., one of users 36, 38, 40, 42) to schedule such an event. Assume for illustrative purposes that user 36 wishes to schedule the event (e.g., pizza with friends in Mountain View, Calif.) to occur at some time in the future (e.g., 1 Nov. 2012).

Accordingly, user 36 may define such an event within social network 54. User 36 may define a time/date/location for the event; such as 8:00 p.m. on 1 Nov. 2012 at Tony's Pizza in Mountain View, Calif. Further, user 36 may define a list of invitees, such as Mary (user 38), Joe (user 40) and Cindy (user 42).

For the following example, assume that user 36 defined the above-described event (e.g., pizza with friends in Mountain View, Calif.), that invitations were sent from user 36 to users 38, 40, 42, and all invitations were accepted. Further, assume that it is the night of the event (e.g., 1 Nov. 2012) and approximately the time at which the event is scheduled to begin (e.g., 8:00 p.m.).

Figure 3A:
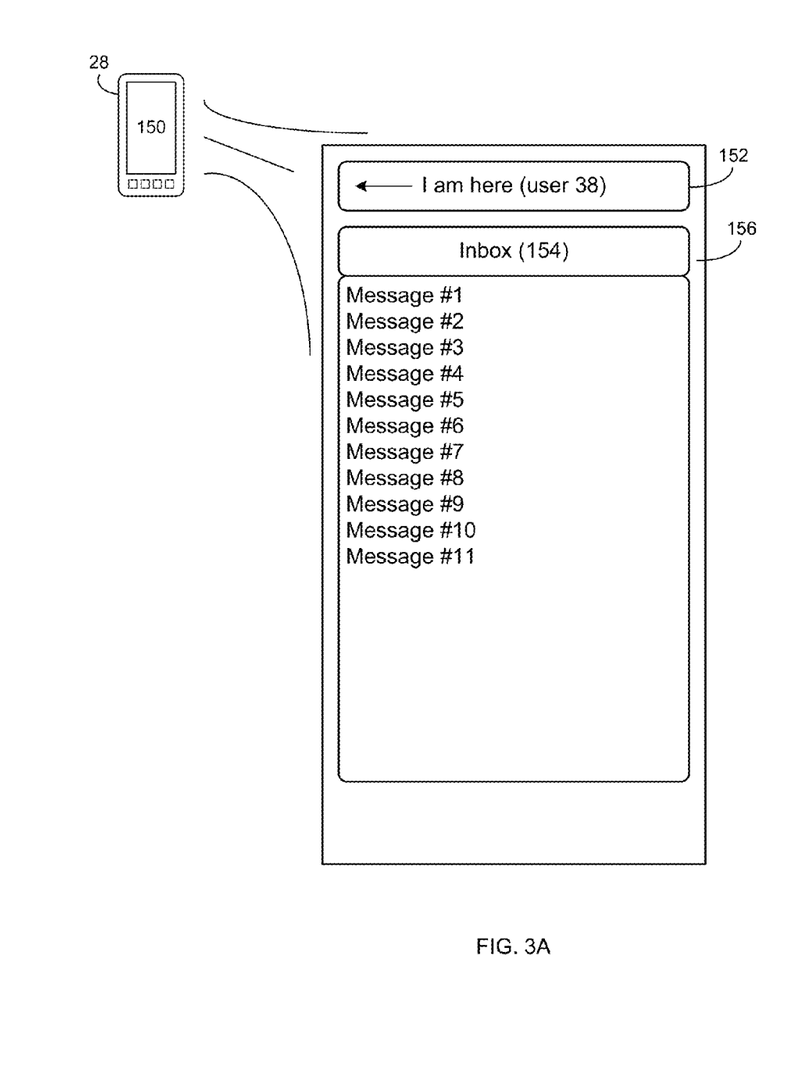
FIGS. 3A-3D are diagrammatic views of a display screen rendered by the content distribution process of FIG. 1 according to an embodiment of the present disclosure.

Referring also to FIG. 3A, data-enabled, cellular telephone 28 is shown to include display screen 150. Content distribution process 10 may be configured to associate 100 a first portion (e.g., portion 152) of display screen 150 with social network 54. Accordingly, the first portion (e.g., portion 152) of display screen 150 may be configured by content distribution process 10 to display content from social network 54. Content distribution process 10 may receive 102 initial social network content 56 from social network 54 and may dynamically render 104 initial social network content 56 within the first portion (e.g., portion 152) of display screen 150. Initial social network content 56 may be associated with the event (e.g., pizza with friends in Mountain View, Calif.) scheduled within social network 54.

Specifically, assume that user 36 (i.e., the organizer of the event) is very interested in attending the event, but wishes to go to the event only once some of the invitees (e.g., users 38, 40, 42) begin to show up. Accordingly, content distribution process 10 may be configured to allow the user (e.g., user 36) to monitor the status of the event while still be able to perform other work. For example, content distribution process 10 may be configured to allow user 36 to use email application 154 (or some other application) within a second portion (e.g., portion 156) of display screen 150 while being updated on the status of the event via portion 152 of display screen 150.

Assume for illustrative purposes that none of the invitees (e.g., users 38, 40, 42) have showed up at the event yet. Further assume that user 36 is a block away at a coffee shop waiting for the event began. Accordingly, user 36 may take this opportunity to review his e-mail via e-mail application 154. As discussed above, e-mail application 154 may be executed within a second portion (e.g., portion 156) of display screen 150. Further and as discussed above, content distribution process 10 may be configured to associate 100 a first portion (e.g., portion 152) of display screen 150 with social network 54. Accordingly, while user 36 is working on email application 154 within second portion (e.g., portion 156) of display screen 150, content distribution process 10 may receive 102 initial social network content 56 from social network 54 and may dynamically render 104 initial social network content 56 within the first portion (e.g., portion 152) of display screen 150.

When dynamically rendering 104 initial social network content 56 within first portion 152 of display screen 150, content distribution process 10 may scroll 106 all or a portion of initial social network content 56 within first portion 152 of display screen 150. Accordingly, as the users participating in the event (e.g. users 36, 38, 40, 42) begin to provide commentary (e.g. in the form of text-based comments, audio, video and/or photographic images), such commentary may be rendered within first portion 152 of display screen 150 by content distribution process 10.

For example, if user 38 is the first to arrive at the event, user 38 may provide commentary (in the form of a text message) stating that "I am here". Upon receiving such text-based commentary, social network 54 may provide such text-based commentary to content distribution process 10 in the form of initial social network content 56. As discussed above, initial social network content 56 may be at least a portion of a media stream (not shown) included within social network 54, wherein this media stream is streaming commentary provided by social network 54. This media stream may concern people that a particular user is friends with within social network 54 and/or events that are occurring within social network 54.

Upon receiving 102 social network commentary 56 from social network 54, content distribution process 10 may dynamically render 104 initial social network content 56 within the first portion (e.g., portion 152) of display screen 150. Accordingly, content distribution process 10 may dynamically render 104 "I am here" within first portion 152 of display screen 150. This message "I am here" may be rendered 104 in a ticker-tape manner in which "I am here" scrolls 106 (in this example) to the left.

While "I am here" is described above as scrolling 106, this is for illustrative purposes only and is not intended to be a limitation of this disclosure as other configurations are possible. For example, content distribution process 10 may be configured to dynamically render 104 the message "I am here" in a fashion in which e.g., the message fades into view within first portion 152 of display screen 150 and then fades out of view. Accordingly, when dynamically rendering 104 initial social network content 56 within first portion 152 of display screen 150, content distribution process 10 may simply render 108 initial social network content 56 in a non-static manner.

Assume for illustrative purposes that user 36 is interested in what user 38 said, namely "I am here". Further, assume that display screen 150 is a touch screen that is capable of receiving a touch-based command (e.g., via a finger or a stylus) from user 36. Accordingly and continuing with the above-stated example, assume that upon seeing the "I am here" message within first portion 152 of display screen 150, user 36 touches first portion 152 of display screen 150. Content distribution process 10 may receive the touch-based indication within first portion 152 of display screen 150, thus generating user indication 58.

Figure 3B:
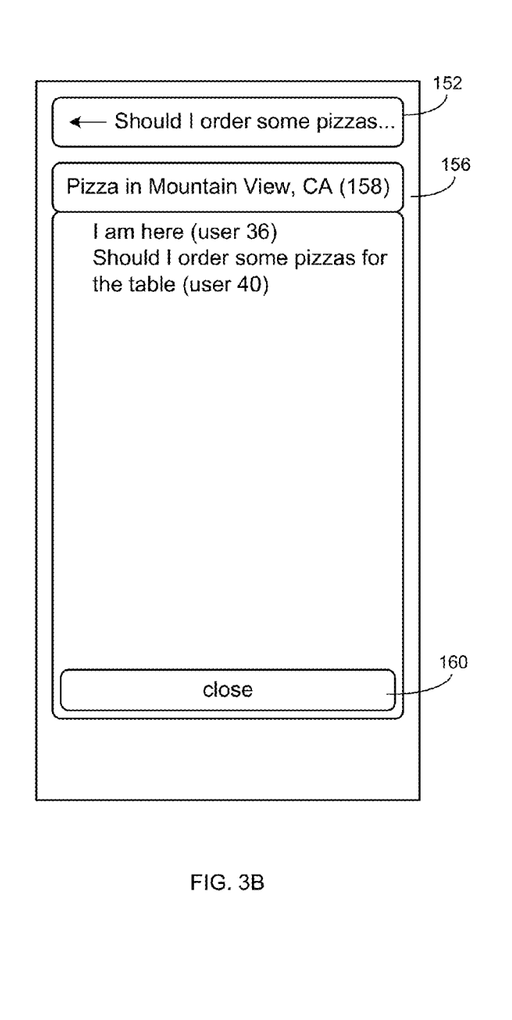

Content distribution process 10 may, in response to receiving user indication 58, render 112 enhanced social network content 158 within second portion 156 of display screen 150. Accordingly and upon receiving user indication 58, content distribution process 10 may minimize e-mail application 154 (which was displayed within second portion (e.g., portion 156) of display screen 150) and render 112 enhanced social network content 158 within second portion 156 of display screen 150 (as shown in FIG. 3B). Enhanced social network content 158 may include content associated with the event (e.g., pizza with friends in Mountain View, Calif.) occurring within social network 54. For example, enhanced social network content 158 may include one or more posts made by attendees of the event.

While content distribution process 10 is rendering 112 enhanced social network content 158 within second portion 156 of display screen 150, content distribution process 10 may continue to dynamically render 104 initial social network content 56 within the first portion 152 of display screen 150. Accordingly, updates concerning the event (e.g., pizza in Mountain View, Calif.) may continue to be displayed within first portion 152 of display screen 150.

Figure 3C:
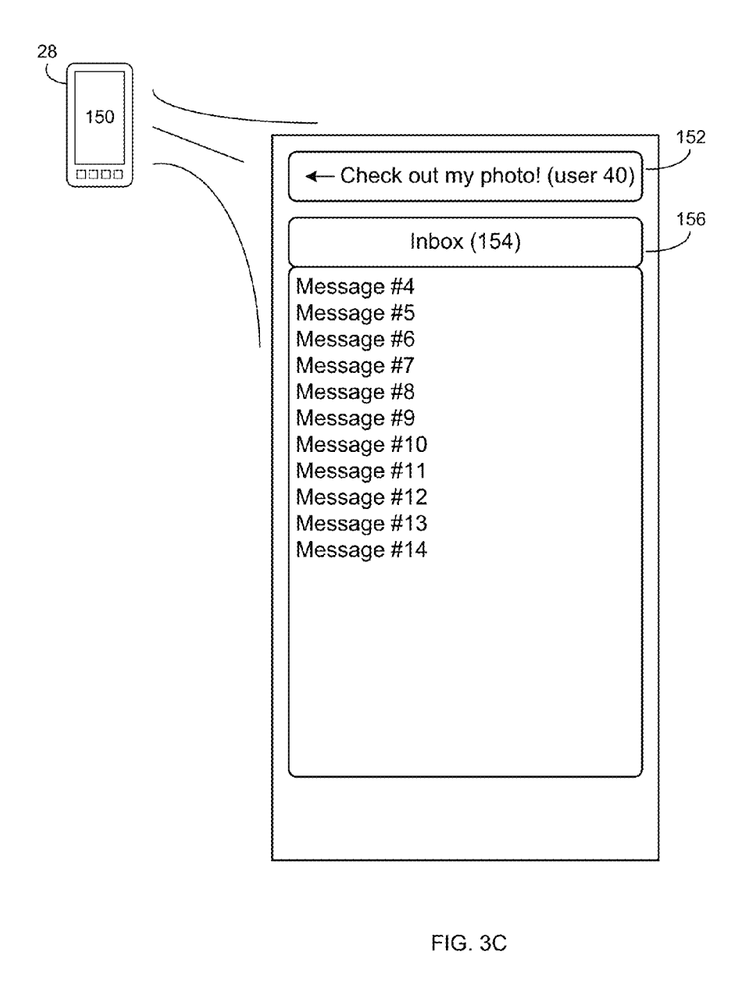

Second portion 156 of display screen 150 may include "close" button 160 that e.g., user 36 may select to cease rendering 112 enhanced social network content 158 within second portion 156 of display screen 150 and may once again render email application 154 within portion 156 of display screen 150 (as shown in FIG. 3C).

Assume that user 40 subsequently arrives at the event (e.g., pizza in Mountain View, Calif.) and provides commentary (in the form of a text message) stating that "Should I order some pizzas for the table". Upon receiving such text-based commentary, social network 54 may provide such text-based commentary to content distribution process 10 in the form of initial social network content 56. Upon receiving 102 initial social network content 56 from social network 54, content distribution process 10 may dynamically render 104 initial social network content 56 within the first portion (e.g., portion 152) of display screen 150. Accordingly, content distribution process 10 may dynamically render 104 " Should I order some pizzas for the table" within first portion 152 of display screen 150.

Assume that user 40 decides to order some pizzas for the table and they are subsequently delivered to the table. Further assume that user 40 takes a photograph of a slice of pizza and provides that photograph with the message "Check out my photo!" (in the form of commentary) to the event (e.g., pizza in Mountain View, Calif.) within social network 54.

Upon receiving such commentary (e.g., the photograph with the message "Check out my photo!"), social network 54 may provide such commentary to content distribution process 10 in the form of initial social network content 56. Upon receiving 102 initial social network content 56 from social network 54, content distribution process 10 may dynamically render 104 initial social network content 56 within the first portion (e.g., portion 152) of display screen 150. Accordingly, content distribution process 10 may dynamically render 104 "Check out my photo!" within first portion 152 of display screen 150. As discussed above, this message "Check out my photo!" may be rendered 104 in a ticker-tape manner in which "Check out my photo!" scrolls 106 (in this example) to the left.

Assume for illustrative purposes that user 36 is interested in what user 40 said, namely "Check out my photo!". Accordingly and continuing with the above-stated example, assume that upon seeing the "Check out my photo!" message within first portion 152 of display screen 150, user 36 touches first portion 152 of display screen 150. Content distribution process 10 may receive the touch-based indication within first portion 152 of display screen 150, thus generating user indication 60

Figure 3D:
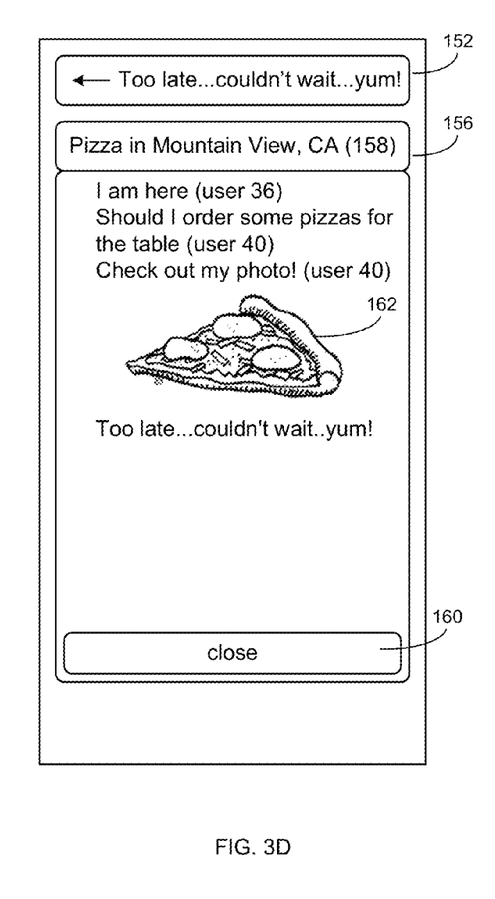

Content distribution process 10 may, in response to receiving user indication 60, render 112 enhanced social network content 158 within second portion 156 of display screen 150. Accordingly and upon receiving user indication 60, content distribution process 10 may again minimize e-mail application 154 (which was displayed within second portion (e.g., portion 156) of display screen 150) and render 112 enhanced social network content 158 within second portion 156 of display screen 150 (as shown in FIG. 3D). In this particular example, enhanced social network content 158 is shown to include an image (e.g., photograph 162)

As discussed above, second portion 156 of display screen 150 may include "close" button 160 that e.g., user 36 may select to cease rendering 112 enhanced social network content 158 within second portion 156 of display screen 150 and may once again render email application 154 within portion 156 of display screen 150 (as shown in FIG. 3A).

Figure 4:
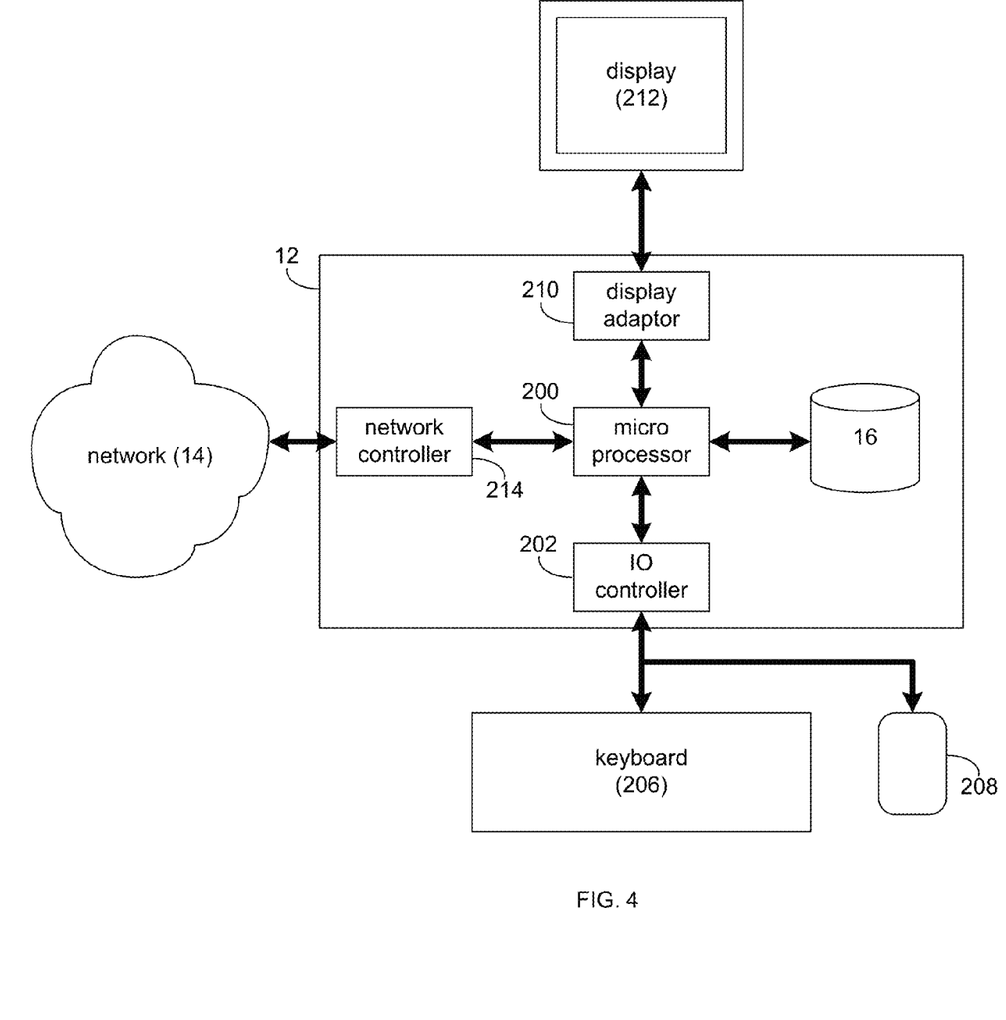
FIG. 4 is a diagrammatic view of the computing device of FIG. 1 according to an embodiment of the present disclosure.

Referring also to FIG. 4, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, content distribution process 10 may be substituted for computing device 12 within FIG. 4, examples of which may include but are not limited to client electronic devices 28, 30, 32, 34.

Computing system 12 may include microprocessor 200 configured to e.g., process data and execute instructions/code for content distribution process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 206, mouse 208, USB ports (not shown), and printer ports (not shown). Display adaptor 210 may be configured to couple display 212 (e.g., a CRT or LCD monitor) with microprocessor 200, while network adapter 214 (e.g., an Ethernet adapter) may be configured to couple microprocessor 200 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 250) of a general purpose computer/special purpose computer/other programmable data processing apparatus (e.g., computing device 12), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    associating a first portion of a display screen with a social network and a second portion of the display screen with an application software, wherein the display screen is included within a handheld device;
    receiving initial social network content from the social network, wherein the initial social network content is associated with an update on a status of an event occurring within the social network;

dynamically rendering the initial social network content within the first portion of the display screen including the update on the status of the event;
providing the application software for use within the second portion of the display screen;
receiving a user indication within the first portion of the display screen; and
in response to the user indication within the first portion of the display screen, dissociating the application software for use from within the second portion of the display screen and rendering enhanced social network content within the second portion of the display screen;
wherein the initial social network content is at least a portion of a media stream included within the social network for the event occurring within the social network; and
wherein the enhanced social network content includes content associated with the event occurring within the social network.

2. A computer-implemented method comprising:
associating a first portion of a display screen with a social network and a second portion of the display screen with an application software;
receiving initial social network content from the social network, wherein the initial social network content is associated with an update on a status of an event occurring within the social network; and
dynamically rendering the initial social network content within the first portion of the display screen including the update on the status of the event;
providing the application software for use within the second portion of the display screen;
receiving a first user indication within the first portion of the display screen; and
in response to the first user indication within the first portion of the display screen, dissociating the application software for use from within the second portion of the display screen and rendering enhanced social network content within the second portion of the display screen;
wherein the display screen is included within a handheld device.

3. The computer-implemented method of claim 2 wherein dynamically rendering the initial social network content within the first portion of the display screen includes:
scrolling the initial social network content within the first portion of the display screen.

4. The computer-implemented method of claim 2 wherein dynamically rendering the initial social network content within the first portion of the display screen includes:
rendering the initial social network content in a non-static manner.

5. The computer-implemented method of claim 2 wherein the initial social network content includes text-based initial social network content.

6. The computer-implemented method of claim 2 wherein the initial social network content is at least a portion of a media stream included within the social network.

7. The computer-implemented method of claim 2 further comprising:
receiving a second user indication within the second portion of the display screen.

8. The computer-implemented method of claim 7 further comprising:
in response to the second user indication within the second portion of the display screen, dissociating the rendering of the enhanced social network content from within the second portion of the display screen and providing back the application software for use within the second portion of the display screen.

9. The computer-implemented method of claim 2 wherein the enhanced social network content includes an image.

10. The computer-implemented method of claim 2 wherein the enhanced social network content includes content associated with the event occurring within the social network.

11. The computer-implemented method of claim 2 wherein the display screen is a touch screen and the first user indication is received in response to a user of the handheld device touching the touch screen.

12. A computing system including a processor and memory configured to perform operations comprising:
associating a first portion of a display screen with a social network and a second portion of the display screen with an application software;
receiving initial social network content from the social network, wherein the initial social network content is associated with an update on a status of an event occurring within the social network;
dynamically rendering the initial social network content within the first portion of the display screen including the update on the status of the event;
providing the application software for use within the second portion of the display screen;
receiving a first user indication within the first portion of the display screen; and
in response to the first user indication within the first portion of the display screen, dissociating the application software for use from within the second portion of the display screen and rendering enhanced social network content within the second portion of the display screen;
wherein the display screen is included within a handheld device.

13. The computing system of claim 12 wherein dynamically rendering the initial social network content within the first portion of the display screen includes:
scrolling the initial social network content within the first portion of the display screen.

14. The computing system of claim 12 wherein dynamically rendering the initial social network content within the first portion of the display screen includes:
rendering the initial social network content in a non-static manner.

15. The computing system of claim 12 wherein the initial social network content includes text-based initial social network content.

16. The computing system of claim 12 wherein the initial social network content is at least a portion of a media stream included within the social network.

17. The computing system of claim 12 further configured to perform operations comprising:
receiving a second user indication within the second portion of the display screen.

18. The computing system of claim 17 further configured to perform operations comprising:
in response to the second user indication within the second portion of the display screen, dissociating the rendering of the enhanced social network content from within the second portion of the display screen and providing back the application software for use within the second portion of the display screen.

19. The computing system of claim 12 wherein the enhanced social network content includes an image.

20. The computing system of claim 12 wherein the enhanced social network content includes content associated with the event occurring within the social network.

21. The computing system of claim 12 wherein the display screen is a touch screen and the user indication is received in response to a user of the handheld device touching the touch screen.

22. The computer-implemented method of claim 2 wherein the application software is an email application.

23. The computing system of claim 12 wherein the application software is an email application.

\* \* \* \* \*